Dec. 31, 1935.　　　　　J. J. HILLER　　　　　2,026,090
MILK CONDITIONING DEVICE
Filed Sept. 6, 1934　　　2 Sheets-Sheet 1
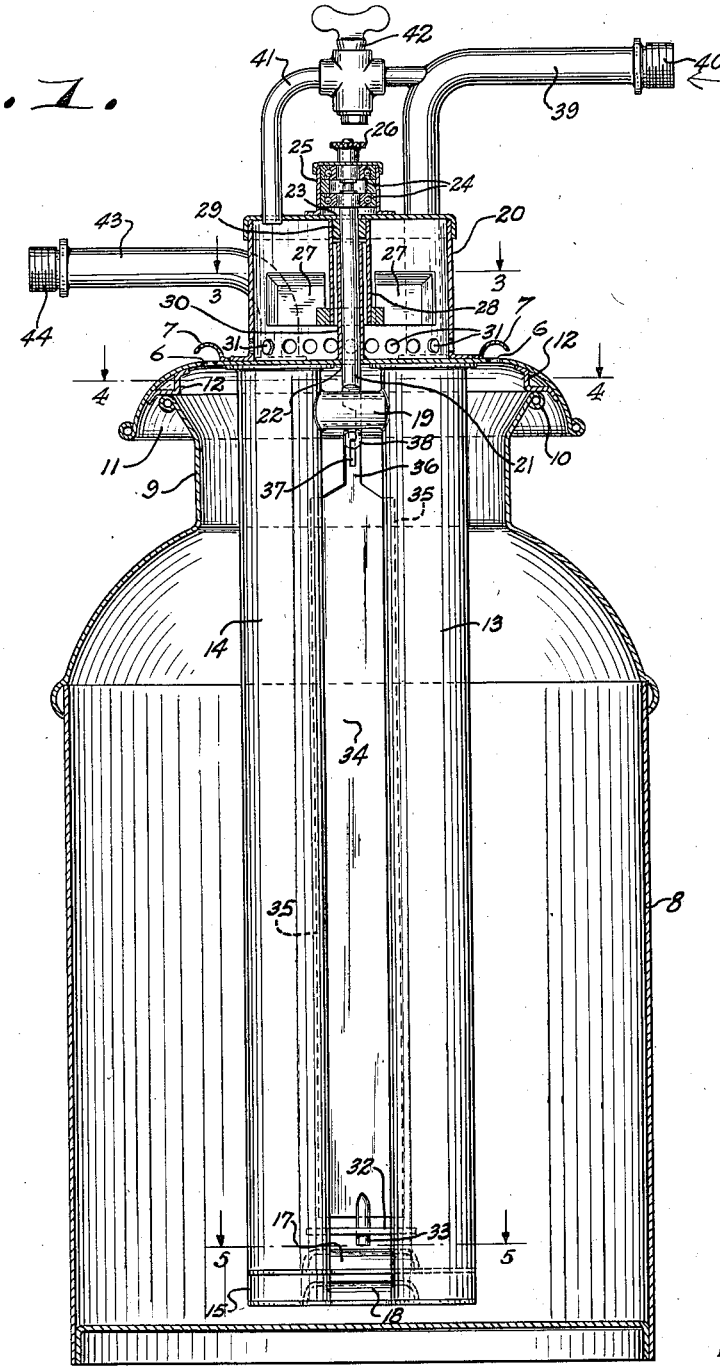
INVENTOR.
Joseph J. Hiller,
BY Morsell, Lieber & Morsell
ATTORNEYS.

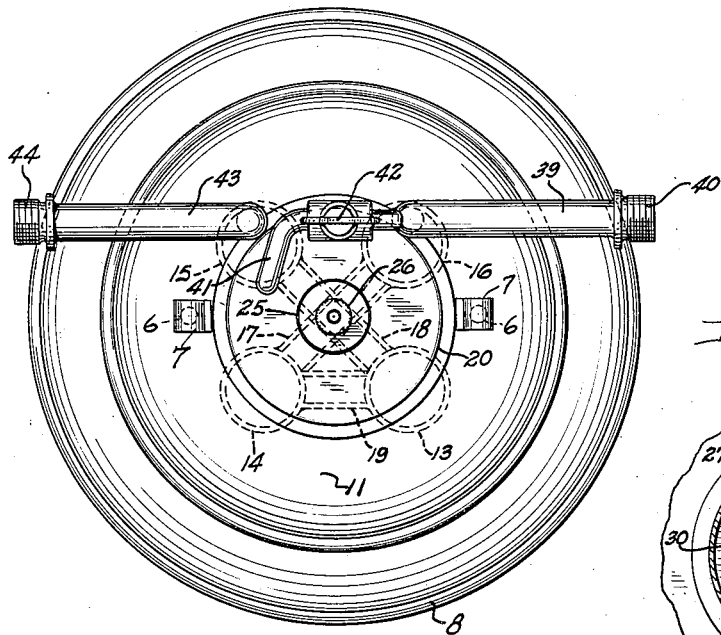
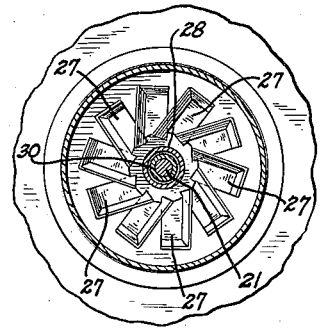
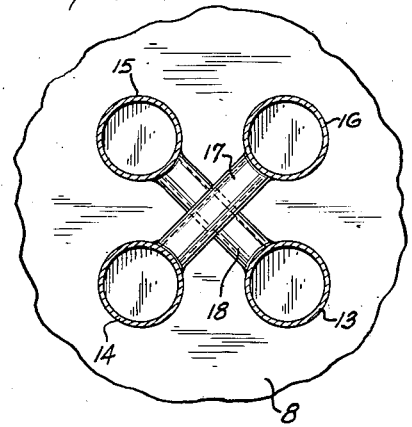
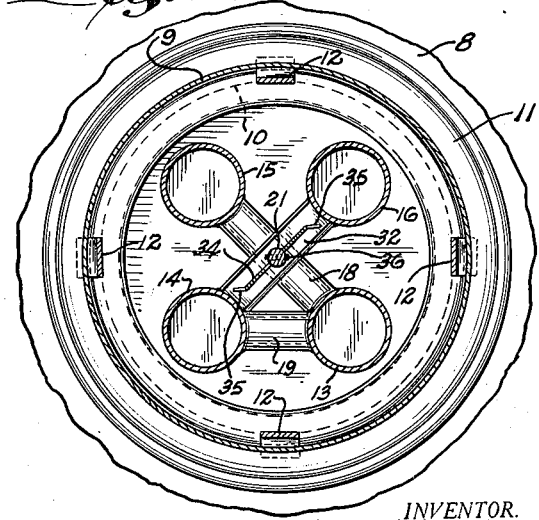

Patented Dec. 31, 1935

2,026,090

UNITED STATES PATENT OFFICE 2,026,090

MILK CONDITIONING DEVICE

Joseph J. Hiller, Oshkosh, Wis.

Application September 6, 1934, Serial No. 742,937

9 Claims. (Cl. 257—74)

This invention relates to improvements in milk conditioning devices, particularly adapted for cooling and deodorizing cans of fresh, warm milk.

One of the objects of the present invention is to provide a milk conditioning device formed integrally with a milk can cover and which will fit any standard sized milk or cream can to cool and condition the milk therein without exposing the milk, and which is water operated and will function at any available water pressure without any substantial attention on the part of the user.

A further object of the invention is to provide a milk conditioning device which cools milk very rapidly to the temperature of the water being used and which will enhance the flavor of the milk and materially lower the bacteria count.

A further general object of the invention is to provide a milk conditioning device which aerates the milk thoroughly and releases gases and volatile odors without uncovering or exposing the milk.

A further object of the invention is to provide a water operated milk cooling and aerating device in which water serves as a cooling medium both interiorly and exteriorly of the can and also serves to drive the aerating propeller.

Another object of the invention is the provision of a milk conditioning device which is sanitary and easy to clean, which draws out animal heat and odors from the milk and releases them thru the neck of the can, which saves time and labor, and which is very inexpensive to operate.

A specific object of the invention is to provide a milk conditioning device wherein cool water is circulated within a can thru a series of tubes in a novel and efficient manner so as to give the utmost efficiency in cooling and to reduce the period of time required for cooling.

A further specific object of the invention is to provide a milk conditioning device wherein water from a common source is used for cooling and is by-passed for operating a water motor which drives an aerating propeller, the amount of water by-passing to the motor being regulatable by a valve and the spent water from the motor being subsequently sprayed over the exterior of the can.

A further specific object of the invention is the provision of a milk conditioning device of the character described wherein the agitator shaft which connects with the water motor is enclosed, so that water cannot leak down said shaft into the milk.

A further object of the invention is to provide a milk conditioning device which is of very simple construction, is strong and durable, and is well adapted for the purposes set forth.

With the above and other objects in view, the invention consists of the improved milk conditioning device, and its parts and combinations as set forth in the claims, and all equivalents thereof.

In the accompanying drawings, in which the same reference characters indicate the same parts in all of the views:

Fig. 1 is a vertical sectional view thru a milk can provided with the improved milk conditioning device;

Fig. 2 is a plan view of the can and milk conditioning device shown in Fig. 1;

Fig. 3 is a sectional view taken on line 3—3 of Fig. 1;

Fig. 4 is a sectional view taken on line 4—4 of Fig. 1; and

Fig. 5 is a sectional view taken on line 5—5 of Fig. 1.

Referring now more particularly to the drawings, it will appear that the numeral 8 indicates a standard milk can of the usual configuration having a reduced open neck 9 formed with an annular, rolled bead 10 and adapted to be closed by a cover.

The improved milk conditioning device includes a cover 11 of dished formation and formed with interior angle brackets 12 adapted to seat on said neck bead 10 and to support the cover in slightly spaced relation with respect to the open end of the neck to provide vents for the escape of gases. Due to the dished shape of the cover, when positioned as shown, it overhangs the can neck 9 and protects the openings. The cover is also formed with top perforations 6 protected by curved plates 7 which permit circulation thru the perforations while preventing foreign matter and water from entering.

Depending from the inner surface of the cover 11 are four vertical tubes 13, 14, 15, and 16 spaced from one another and arranged in square configuration. The upper ends of said tubes are closed by the cover, and the lower ends of the tubes are also closed, the tubes 14 and 16 being somewhat shorter than the tubes 13 and 15. The lower ends of the shorter tubes 14 and 16 are connected by a pipe 17, while the lower ends of the tubes 13 and 15 are also connected by a pipe 18 extending at right angles to the pipe 17 and immediately therebelow. The upper end portions of the tubes 13 and 14 are connected by a pipe 19.

A hollow turret 20 is mounted centrally on the top surface of the cover 11, and said turret forms an enclosure for a water motor and associated mechanism. A vertical agitator or propeller shaft 21 extends centrally thru said turret, entering a lower opening 22 therefor in the top of the cover and extending thru an alined opening 23 in the top of the turret. The upper end of said shaft 21 is journaled in suitable anti-friction bearings 24 enclosed by a small top housing 25. The upper extremity of said shaft 21, above the housing, carries a knurled knob 26 by which means the shaft may be manually turned at the beginning of operation.

The water motor comprises blades or fins 27 within the turret mounted on and extending radially from a sleeve 28. Said sleeve is carried by a block 29 fast on the propeller shaft 21, so that turning movement of the fins will impart turning movement to the propeller shaft and vice versa. To prevent leakage of the impelling fluid thru the lower opening 22 and from thence into the contents of the can 8, said opening has welded thereabout the lower end of a sleeve 30 spaced surrounding the propeller shaft. Said sleeve 30 terminates just below the block 29, and its height is greater than the level of the greatest amount of liquid which could accumulate within the turret. Liquid discharge from the turret is afforded by means of a plurality of apertures 31 in the lower portion of the turret and which discharge onto the outer surface of the cover 11. Hence, cold liquid employed to operate the motor discharges onto the cover, and due to the curved, overhanging shape of the cover, said cool liquid will spray or flow down over the exterior side wall portions of the can 8 and thereby serve as an exterior cooling medium for the can.

Extended between the lower portions of the tubes 14 and 16 over the pipe 17 is a plate 32 in which the depending end of a pin 33 is journaled. Said pin depends from the lower end of the agitator or propeller 34, and by reference to Figs. 1 and 4, it will appear that said agitator is in the form of an elongated, thin, vertical plate having oppositely angled side edge portions 35. Said agitator is positioned for rotatable movement in the space within the outline of the tubes. The upper end portion of the agitator 34 is reduced, as at 36, and is formed with a slot 37 for releasable engagement with a hook 38 formed at the lower end portion of the propeller shaft 21. It will thus be seen that when the propeller shaft is turned by means of the water motor blades 27, this turning movement will be imparted to the propeller 34. Also, when desired, the propeller may be unhooked from the propeller shaft, and the pin 33 is withdrawn from the plate 32. This permits the bodily removal of the propeller from the space between the tubes, whereby the surfaces of said tubes may be readily reached for cleaning, without interference.

The numeral 39 designates a water inlet pipe, threaded at its outer end 40, and adapted to be connected with any convenient source of water supply as a building water tap or faucet. The other end portion of said inlet pipe extends exteriorly of the turret 20 and thru the cover 11 and opens into the upper portion of one of the tubes, as the tube 16. A by-pass pipe 41, of a smaller diameter, extends from an intermediate portion of the inlet pipe 39 thru the top of the turret and discharges into the upper interior portion of the turret. A valve 42 within said by-pass pipe 41 may be adjusted to regulate fluid flow thru said pipe. A water outlet pipe 43 extends from an upper end portion of another tube (the tube 15 in the example shown) thru the cover 11 and is adapted to discharge water exteriorly of the milk can. The outer end of said outlet pipe 43 is threaded, as at 44, so that a drain tube may be connected thereto if desired.

In use, the milk can 8 is filled with milk or cream in the usual manner. Then, the cover 11, carrying all of the milk conditioning apparatus, is disposed on the can neck 9 in the manner shown. This disposition of the cover will project the tubes 13, 14, 15, and 16 down vertically into the can and into the contents thereof. The same is true with respect to the propeller 34. If the water inlet pipe 39 is now connected with a source of cold water, the cold water from said source will flow through the pipe 39 and then downwardly through the tube 16. From the lower end of the tube 16 the water will flow through the pipe 17 to the tube 14 and will rise in said latter tube, flowing out of the upper end portion of the same through the pipe 19 and into the upper end of the vertical tube 13. The flow in said latter tube is downwardly, and water flows from the lower end of tube 13 to the lower end of tube 15 through the pipe 18. The water then rises in said latter tube and is eventually discharged exteriorly of the apparatus by the water outlet or discharge pipe 43. The tubes 13, 14, 15, and 16 are submerged in the contents of the can, and the cold water has a long course of travel through the various tubes, as explained, and therefore efficiently extracts heat from the liquid contained in the can.

When water is let into the cooling tubes from an outside source, it is also contemplated that the control valve 42 in the by-pass pipe 41 be opened a suitable amount. Some of the water from the source is then free to by-pass through the pipe 41 and is discharged into the turret 20. As this water is under pressure, it forcefully strikes against the water motor blades 27 and thereby rotates the water motor and the shaft 21. Rotation of said shaft rotates the propeller 34, as previously explained. If necessary, to aid in the initial movement of the propeller, the knurled knob at the upper end of the propeller shaft may be manually turned. The by-passed water which is allowed to flow under pressure into the turret to operate the water motor does not collect to any great extent within said turret. This water is free to discharge from the turret through the apertures 31, and after so doing, it flows downwardly and cools the outer surfaces of the can, as previously explained. As the milk is being cooled within the can, hot gases and odors rise therein and discharge from the cover vents 6 and from the can between the cover and the flanged neck portion of the can, this being permitted by the spacer members 12 which elevate the cover and provide vents.

It will thus be seen that in the improved milk conditioning device cold water from any convenient, accessible source is utilized as the cooling medium, and said water is so conducted and utilized as to perform three functions. The water is conducted through a long circuitous path within the can to cool the contents thereof; water from the same source is utilized to drive the water motor which operates the propeller to agitate and aerate the milk and to bring it into proximity to the cooling tubes; and the water for operating the motor is subsequently utilized for cooling the exterior of the can. From the foregoing description it is evident that the improved milk conditioning device is of simple and novel construction, is efficient in its operation, and is well adapted for the purposes described.

What is claimed as the invention is:

1. A milk conditioning device, comprising an open container, a removable cover therefor, an elongated conduit depending from said cover into the container and having an inlet and an outlet, both exteriorly of the container, an agitator within the container, hydro-means for driving said agitator, means for conducting a cooling liquid from a source for circulation through said conduit, and means for by-passing some of said liquid from the source to said hydro-means for operating the latter.

2. A milk conditioning device, comprising, a container, a cover therefor, a plurality of vertical tubes depending from said cover into the container, one of said tubes being connected with an inlet pipe extending exteriorly of the container and another of said tubes being connected with an outlet pipe extending exteriorly of the container, a revoluble agitator depending from the cover, said tubes being arranged in an annular series with the agitator disposed within the annulus, a connection between the upper portions of a pair of tubes, connections between lower portions of alternate tubes, a hydro-motor connected with the agitator for operating it, and means for supplying cold liquid to the inlet pipe and to the hydro-motor.

3. A milk conditioning unit for insertion in a standard milk can, comprising a can cover forming a supporting structure for the unit and having side portions overhanging and protecting the upper end of the can, a plurality of U-shaped conduit members depended from the cover, the lower portions of said conduit members being superimposed and in crossed relationship, said conduit members being connected in series, and a revoluble agitator depended from the cover.

4. A milk conditioning device comprising an open container, a removable cover for said container, a water wheel mounted on said cover, a shaft depending rotatably through the cover, there being an opening in the cover for said shaft, an agitator driven by said shaft, means for directing water under pressure to said water wheel to drive the latter, a sleeve loosely surrounding the shaft and having its lower end welded to the cover around the shaft opening to prevent water from passing through the cover, and means for connecting the water wheel to said shaft above the upper end of said sleeve.

5. A milk conditioning device comprising an open container, a removable cover for said container, a water wheel mounted on said cover, a shaft depending rotatably through the cover, there being an opening in the cover for said shaft, an agitator driven by said shaft, means for directing water under pressure to said water wheel to drive the latter, a sleeve loosely surrounding the shaft and having its lower end welded to the cover around the shaft opening to prevent water from passing through the cover, and means including a sleeve loosely surrounding said first sleeve for connecting the water wheel to said shaft above the upper end of the first sleeve.

6. A milk conditioning device comprising an open container, a removable cover for said container, an elongated conduit depending from said cover into the container, means for circulating a cooling medium through said conduit, an agitator, driving means for said agitator carried by the cover and having a drive shaft depending from the cover, said shaft being formed to detachably receive the upper end of the agitator, and means carried by lower portions of the conduit for removably supporting the lower end of the agitator.

7. A milk conditioning device comprising an open container, a removable cover for said container, an elongated conduit depending from said cover into the container, means for circulating a cooling medium through said conduit, an agitator having an eye at its upper end and a pin at its lower end, driving means for said agitator carried by the cover and having a drive shaft depending from the cover, said shaft being formed with a hook engageable with the eye in the upper end of the agitator, and an apertured plate in connection with lower portions of the conduit for removably and rotatably receiving the pin on the lower end of the agitator.

8. A milk conditioning device comprising a container, a cover therefor, a cold liquid conduit depending from the cover into the container, a revoluble agitator also depending into the container, a hydro-motor for operating said agitator, means for supplying cold liquid to said conduit, a by-pass for said liquid leading to the motor to drive the latter, and means in said by-pass for controlling the amount of liquid to the motor independently of the liquid passing into the cold liquid conduit to thereby permit control of the speed of the motor without affecting the amount of cooling liquid passing through the cold liquid conduit.

9. A milk conditioning device comprising an open container, a removable cover for said container, a water wheel mounted on said cover, a shaft depending rotatably through the cover, there being an opening in the cover for said shaft, an agitator driven by said shaft, means for directing water under pressure to said water wheel to drive the latter, a sleeve loosely surrounding the shaft and having its lower end in waterproof connection with the cover around the shaft opening to prevent water from passing through the cover, and means for connecting the water wheel to said shaft above the upper end of said sleeve.

JOSEPH J. HILLER.